United States Patent [19]

Jensen

[11] Patent Number: 5,157,685
[45] Date of Patent: Oct. 20, 1992

[54] METHOD AND APPARATUS FOR PREPARING A MELT FOR MINERAL FIBRE PRODUCTION

[75] Inventor: Moller Jensen, Roskilde, Denmark
[73] Assignee: Rockwool International A/S, Hedehusene, Denmark
[21] Appl. No.: 688,549
[22] PCT Filed: Dec. 22, 1989
[86] PCT No.: PCT/DK89/00309
 § 371 Date: Jun. 21, 1991
 § 102(e) Date: Jun. 21, 1991
[87] PCT Pub. No.: WO90/07470
 PCT Pub. Date: Jul. 12, 1990

[30] Foreign Application Priority Data

Dec. 23, 1988 [DK] Denmark ............................ 7206/88

[51] Int. Cl.⁵ .............................................. H05B 7/00
[52] U.S. Cl. .......................................... 373/22; 373/18; 373/24; 373/80; 219/121.35; 219/121.37; 219/121.48; 65/2; 65/29
[58] Field of Search ............ 373/18, 20, 22, 24, 373/80; 219/126, 121.55, 121.37, 121.48, 121.51, 121.36; 65/2, 11.1, 29, 160, 162; 432/58, 161, 177

[56] References Cited

U.S. PATENT DOCUMENTS

| | | | |
|---|---|---|---|
| 1,819,239 | 8/1931 | Greene | 373/80 |
| 2,451,582 | 10/1948 | Smith | 432/58 |
| 2,527,144 | 10/1950 | Meacham et al. | 432/161 |
| 2,585,607 | 2/1952 | Whitmore et al. | 65/335 |
| 3,269,827 | 8/1966 | Arnesen et al. | 373/80 |
| 3,441,651 | 4/1969 | Viens et al. | 373/80 |
| 3,573,016 | 3/1971 | Rees | 65/2 |
| 4,606,038 | 8/1986 | Lugscheider et al. | 373/24 |
| 4,761,793 | 8/1988 | Digne et al. | 373/24 |
| 4,797,142 | 1/1989 | Jensen | 65/2 |
| 5,017,754 | 5/1991 | Drouet et al. | 219/121.36 |
| 5,046,144 | 9/1991 | Jensen | 219/121.36 |

FOREIGN PATENT DOCUMENTS

| | | |
|---|---|---|
| 0109086 | 5/1984 | European Pat. Off. |
| 2629074 | 9/1989 | France |
| WO82/00460 | 2/1982 | PCT Int'l Appl. |
| WO87/06926 | 11/1987 | PCT Int'l Appl. |
| WO88/0919-09 | 11/1988 | PCT Int'l Appl. |
| 1320377 | 6/1973 | United Kingdom |

Primary Examiner—Bruce A. Reynolds
Assistant Examiner—Tu Hoang
Attorney, Agent, or Firm—Watson, Cole, Grindle & Watson

[57] ABSTRACT

A method of preparing a melt for mineral fibre production wherein a mixture of mineral fibre-forming raw materials is introduced into a shaft furnace and is heated to melting temperature by a plasma gas stream formed in a plasma torch and wherein waste material from mineral fibre production is introduced into the plasma gas stream by a rotatable screw conveyor mounted in a feed pipe, the melt formed in the shaft furnace is being discharged from the bottom of the furnace and passed to a fiberizing apparatus in which it is converted into mineral fibres.

6 Claims, 3 Drawing Sheets

METHOD AND APPARATUS FOR PREPARING A MELT FOR MINERAL FIBRE PRODUCTION

BACKGROUND OF THE INVENTION

This invention comprises a method of preparing a melt for mineral fibre production comprising introducing a mixture of mineral fibre forming raw material into a shaft furnace and heating the mixture by means of a plasma gas stream formed in a plasma torch, discharging the melt thus formed from the bottom of the shaft furnace and passing the melt to a fiberizing apparatus in which the melt is converted into mineral fibres.

International patent publication No. WO87/06926 discloses a method of the above-mentioned type.

Various by-products which are generally called mineral wool waste are formed during the manufacture of mineral wool. These by-products include a fine powder-like material which is formed in connection with the cutting, e.g. edge cutting, of mineral wool mats so as to form mineral wool slabs having desired dimensions. The term mineral wool waste also includes pieces of such mineral wool slabs which pieces may contain the binder used during the production of the mineral wool slabs in a cured or non-cured state.

The waste material obtained by conventional mineral fibre production thus exists in varying form viz. ranging from a fine powder-like material over fibre lumps and pieces of slabs to a coarse slaggy material.

Up to now it has been attempted to get rid of such waste material by dumping it at specially suitable dumping sites in nature. However, it has become increasingly costly and difficult to dispose of the waste material in this manner due to the difficulties in finding suitable dumping sites and the increasing public disapproval against dumping industrial waste products in nature.

Since the waste material has a composition which is essentially the desired one for mineral fibre production but does not have the desired physical shape, it represents an attractive material if it can be recycled to and re-used in mineral fibre production.

The direct introduction of the waste material into the shaft furnace is normally out of the question since it ordinarily is present in the above-mentioned varying physical shapes. Therefore, the waste material cannot be handled by means of the equipment normally used in connection with mineral fibre production. Furthermore, due to its physical state which makes it insulating and prevents air penetration, it adversely affects the melting process in a shaft furnace, in particular when the melting operation is based on combustion of fossil fuels. It has been attempted to re-use waste material from mineral fibre production by converting it into briquettes and to introduce such briquettes into the shaft furnace together with the conventional starting materials. However, such re-use requires admixture of a binder and shaping of the briquettes by pressing or moulding. Apart from significantly increasing the cost of the mineral fibre production, it is difficult to find binders which on one hand impart to the briquettes the required strength and on the other hand are decomposed without creating environmental problems during the melting operation.

International patent publication No. WO82/00460 discloses a method of preparing a melt for mineral fibre production. The prior art method comprises the use of a shaft furnace which at its lower end is connected with a melting chamber which is heated by plasma gas formed in a plasma torch located in the melting chamber. Furthermore, there are provided conduits for blowing fine starting materials and mineral fibre waste into the melting chamber.

A prerequisite for introducing waste material from mineral fibre production into the plasma gas in a method of the above-mentioned type is that only fine particles are used or that the waste material is subjected to disintegration in order to have all portions thereof converted into particles. However, such measures require substantial investments and present problems with respect to the handling of the finely divided material.

The object of the invention is to utilize waste material from mineral fibre production and having varying physical shapes in a method of the above-mentioned type without the need of subjecting the waste material to a preceding complete disintegration.

SUMMARY OF THE INVENTION

This object is achieved with the method of the invention which method is characterized in introducing waste materials from mineral fibre production into the plasma gas stream by means of a rotatable screw conveyor mounted in a feed pipe before this gas stream enters the shaft furnace.

By using such a screw conveyor it is possible to introduce the waste material whether it is present in the form of a dust-like material or whether it is present in the form of mineral wool agglomerates or large lumps. Thus, it is only necessary to effect a simple disintegration of pieces of waste material in the form of whole mineral wool slabs of fragments thereof.

The feed method described above presents the further advantage that the feed rate can be readily varied so as to allow for a continuous adjustment of the supply of waste material to the rate of the mineral wool production and/or the amount of the waste material formed.

A further advantage of introducing the waste material into the plasma gas as described above is that the heat sensitive parts of the screw conveyor, e.g. the bearings, can be mounted spaced from the plasma gas and so that they do not have to be subjected to the high temperatures (up to 5500° C.) which prevail in the plasma gas. The sturdy construction which characterizes a screw conveyor also has the effect that it is possible to press waste material through a shell which may be formed in the feed pipe at the place where it opens into the plasma gas stream.

The invention also relates to an apparatus for the preparation of a melt for mineral wool production, the apparatus comprising a shaft furnace having means for introducing mineral fibre-forming raw materials therein, means for discharging a melt from the bottom of the furnace, and at least one plasma torch which is connected with the interior of the shaft furnace through a connection pipe.

The characteristic feature of this apparatus is that it further comprises a feed pipe for waste material, the said feed pipe being connected with the connecting pipe and having mounted therein a rotatable screw conveyor. In a particularly preferred embodiment of the apparatus of the invention, the feed pipe surrounding the screw conveyor has a gradually increasing diameter viewed in the direction towards the connecting pipe in order to reduce the risk of clogging of the screw conveyor in case the operation of the cooperating equipment is stopped.

The construction and function of plasma torches are described in i.a. International patent publication No. WO88/09109.

Thus, it is also well known to provide the pipe connecting the plasma torch with the shaft furnace with a cooling jacket.

Also the feed pipe surrounding the screw conveyor may be provided with a water cooling jacket in the zone adjacent to the connecting pipe in order to reduce the influence of heat on the remaining part of the screw conveyor.

Then end of the screw conveyor which is located away from the connecting pipe passes preferably through the bottom of a feed vessel containing the waste material and in which it is caught by the screw conveyor and is forwarded towards the connecting pipe.

The screw conveyor is preferably driven by a motor having means for varying the speed of the motor. The use of such a motor permits an adjustment of the supply of waste material to the shaft furnace so as to obtain a desired production capacity or to adjust the production capacity to the amount of waste material available.

A satisfactory melting economy is obtained by using the method and the apparatus of the invention. This is due to the fact that the effect actually used for the melting of the waste material actually only is the sum of the effect theoretically necessary for effecting the melting of the waste material and the increased loss of effect due to the use of additional cooling water which latter effect is due to the use of a connecting pipe having a greater diameter than the one normally used. The total energy consumption per ton of waste material has been calculated to be about 800 kWh.

The capacity of an apparatus according to the invention depends on the amount of waste material supplied by means of the screw conveyor and the effect reserve of the plasma torch. The capacity is typically 1–2 t/h.

BRIEF DESCRIPTION OF THE DRAWINGS

The invention will now be described in further detail with reference to the drawing in which.

DETAILED DESCRIPTION OF THE PREFERRED EMBODIMENT

Figure 1:
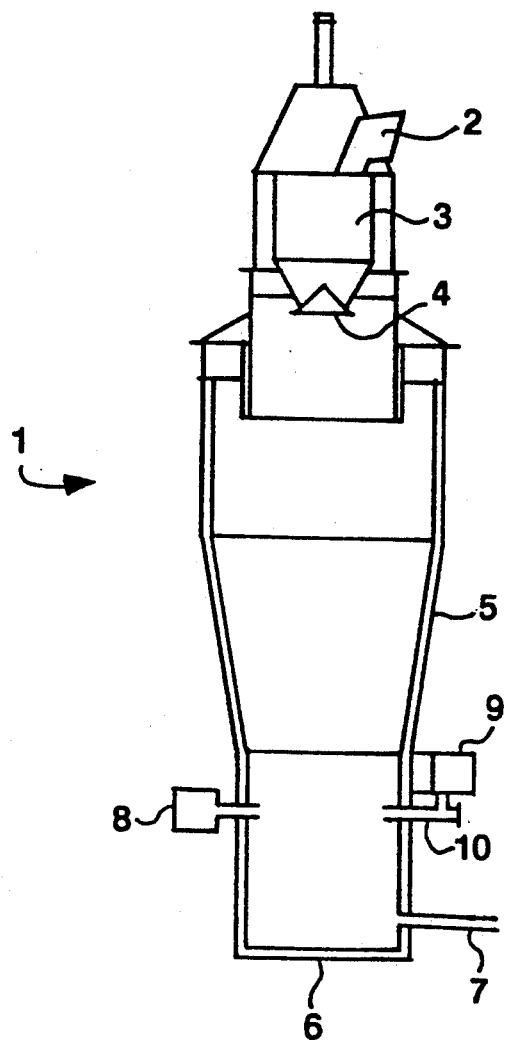
FIG. 1 shows a schematic perspective view of an embodiment of the apparatus of the invention.

FIG. 1 shows a cupola furnace 1 having a feed hopper 2, which communicates with a vessel 3 having a bottom which is constituted by an axially displacable cone 4. Below the vessel 3 there is a melting chamber which is enclosed by a water-cooled jacket 5. The cupola furnace 1 comprises at its lower end a plane furnace bottom 6 and a melt outlet is provided at a suitable distance above the bottom 6. A number of plasma generators 8 are built into the furnace wall some distance above the level wherein the melt outlet 7 is placed. Also, at the same level an air inlet pipe 9 is provided, the air inlet pipe 9 communicating with a number of tuyeres 10.

Mineral fibre forming raw materials and a carbonaceous material, such as coke, are fed into the melting chamber through the hopper 2 and the vessel 3, the dosage being effected by suitable adjustment of the cone 4.

In the melting chamber the mineral fibre forming raw materials are heated by effecting a combustion of the carbonaceous material and subsequently the heated raw materials are melted in the strong heat generated by the plasma generators 8.

The melt formed descends down towards the bottom 6 of the furnace and the melt is discharged through the melt outlet 7.

Figure 2:
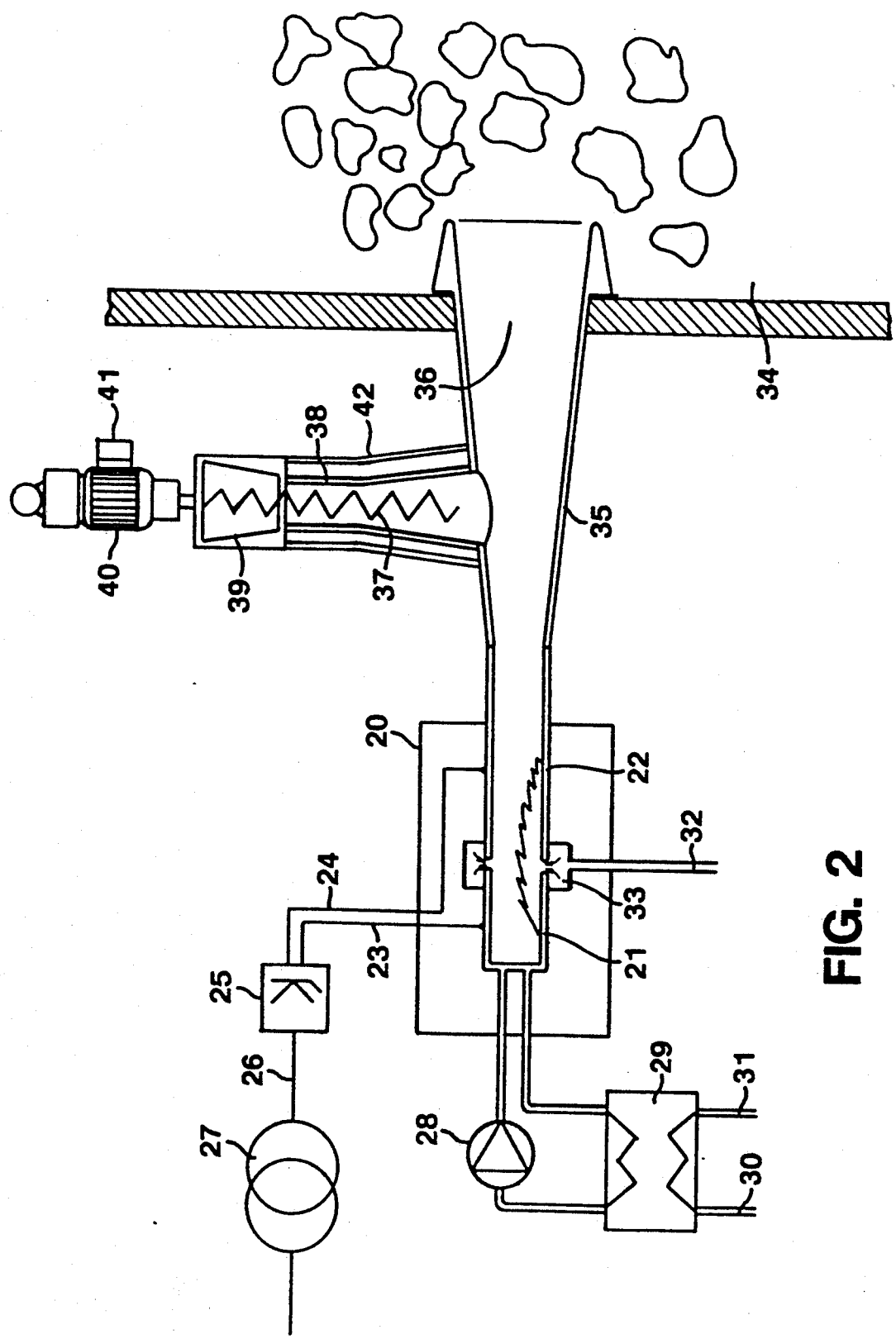
FIG. 2 shows a schematic horizontal cross sectional view of a feed pipe, a plasma torch and a connecting pipe of a preferred embodiment of an apparatus according to the invention.

FIG. 2 illustrates a plasma torch which is generally designated 20 and which comprises two separate tubular electrodes 21 and 22 to which direct current is fed through conductor 23 and 24 from a thyristor 25. Current is fed to the thyristor 25 through a conductor 26 which comprises a transformer 27. The tubular electrodes 21 and 22 are provided with cooling jackets and cooling water is introduced into the cooling jackets by means of a pump 29 and is recycled through a heat exchanger 24. A cooling medium is introduced into the heat exchanger 29 through a feed pipe 30 and is discharged through an outlet pipe 31. The plasma torch 20 also comprises a pipe 32 for introducing compressed air into a distributing chamber 33 from which it flows into the space between the electrodes 21 and 22.

The plasma torch 20 is connected with a shaft furnace 34 through a connecting pipe 35 which has a cross sectional area which gradually increases from the plasma torch towards the shaft furnace and the end of the connecting pipe is inserted 36 in a hole in the wall of the shaft furnace.

The apparatus also comprises a screw conveyor 37 which is mounted rotatably in a feed pipe 38 opening into the connecting pipe 35, the diameter of the feed pipe 38 increasing towards the connecting pipe 35. The end of the screw conveyor 37 which is located opposite to the connecting pipe 35 passes through the bottom of a feed vessel 39 and is connected with a motor 40 having means 41 of varying the speed of the motor.

The feed pipe 35 is provided with a water cooling jacket 42.

Figure 3:
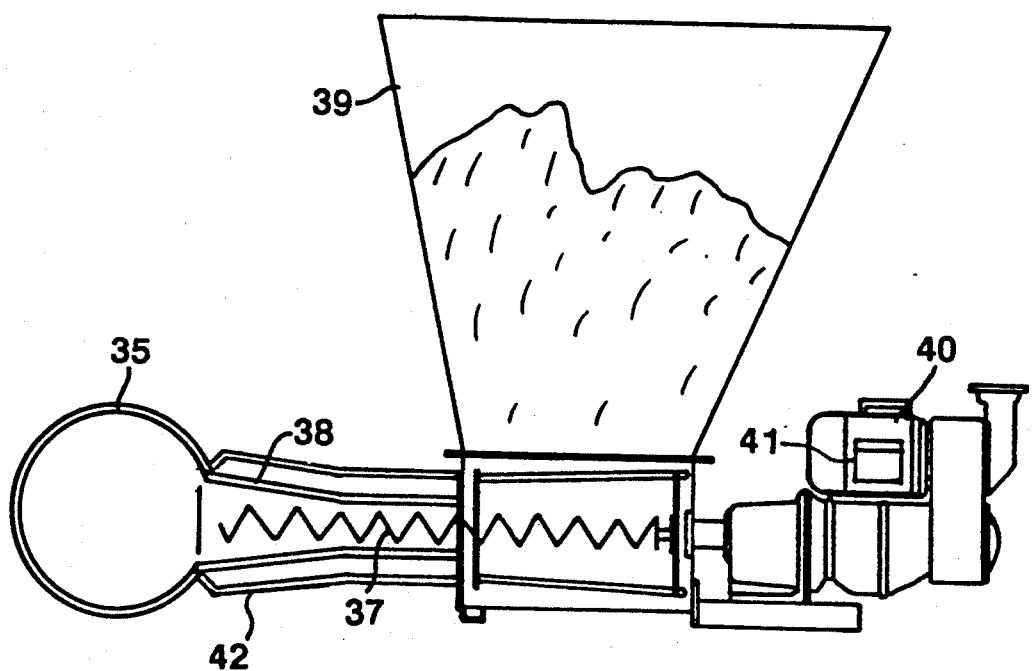
FIG. 3 shows a side view partly in vertical section of a feed pipe which is connected with a connecting pipe between a plasma torch and a shaft furnace.

FIG. 3 shows the screw conveyor 37 and the feed vessel 39 as well as the motor 40, the means 41 for varying the speed of the motor 40, the feed pipe 38, the water cooling jacket 42 and the connecting pipe 35 in further detail.

During operation of the apparatus shown, a plasma gas stream is generated in the plasma torch 20. The plasma gas stream passes through the connecting pipe 35 into the shaft furnace 34.

By rotation of the screw conveyor 37 by means of the motor 40 waste material introduced into the feed container will be pressed through the feed pipe 38 and into the connecting pipe 35 in which it will be caught by the plasma gas stream and be introduced into the shaft furnace 34. The waste material thus introduced is molten together with the starting materials present in the shaft furnace and the melt thus formed passes towards the bottom of the furnace from which it is discharged through an outlet (not shown).

I claim:

1. A method of preparing a melt for mineral wool production comprising the steps of introducing a mixture of mineral fibre-forming raw materials into a shaft furnace having a bottom and heating said mixture by means of a plasma gas stream formed in a plasma torch, discharging the melt formed at said bottom of the shaft furnace and passing the melt to a fiberizing apparatus in which the melt is converted into mineral fibres, and introducing waste minerals into the plasma gas stream by means of a rotatable screw conveyor mounted in a feed pipe before the gas stream enters the shaft furnace.

2. An apparatus for preparing a melt for mineral fibre production comprising a shaft furnace, first supply means for introducing mineral fibre-forming raw materials therein, means for discharging melt from the bottom of the furnace, at least one plasma torch for producing a plasma gas stream which is connected with an interior of the shaft furnace through a connecting pipe, and second supply means for introducing waste material into said plasma gas stream prior to entering said shaft furnace, said second supply means including a feed pipe for waste material connected with the connecting pipe and including a rotatable screw conveyor mounted therein.

3. An apparatus according to claim 2, wherein the feed pipe defines a diameter which increases gradually towards the connecting pipe.

4. An apparatus according to claim 2 including a cooling jacket which surrounds said feed pipe.

5. An apparatus according to claim 2, including a feed vessel with a bottom and wherein a part of the screw conveyor which is located remote from the connecting pipe extends through said bottom of said feed vessel.

6. An apparatus according to claim 2 including a motor for driving the screw conveyor of said motor and means for varying a speed of said motor.

* * * * *

UNITED STATES PATENT AND TRADEMARK OFFICE
CERTIFICATE OF CORRECTION

PATENT NO. : 5,157,685
DATED : October 20, 1992
INVENTOR(S) : Leif Møller Jensen It is certified that error appears in the above-identified patent and that said Letters Patent is hereby corrected as shown below:

Title page, item [75] change
    Inventor: Leif Møller Jensen, Roskilde, Denmark Signed and Sealed this Fourteenth Day of September, 1993

Attest:

BRUCE LEHMAN

*Attesting Officer*    *Commissioner of Patents and Trademarks*